(12) United States Patent
Jarlengrip et al.

(10) Patent No.: US 12,365,403 B2
(45) Date of Patent: Jul. 22, 2025

(54) VEHICLE

(71) Applicant: Volvo Truck Corporation, Gothenburg (SE)

(72) Inventors: Johan Jarlengrip, Askim (SE); Anders Tenstam, Öjersjö (SE); Maria Johansson Ohlin, Lerum (SE)

(73) Assignee: Volvo Truck Corporation, Gothenburg (SE)

( * ) Notice: Subject to any disclaimer, the term of this patent is extended or adjusted under 35 U.S.C. 154(b) by 383 days.

(21) Appl. No.: 17/927,562

(22) PCT Filed: Jun. 1, 2021

(86) PCT No.: PCT/EP2021/064650
§ 371 (c)(1),
(2) Date: Nov. 23, 2022

(87) PCT Pub. No.: WO2021/245066
PCT Pub. Date: Dec. 9, 2021

(65) Prior Publication Data
US 2023/0211833 A1 Jul. 6, 2023

(30) Foreign Application Priority Data
Jun. 2, 2020 (EP) ..................................... 20177736

(51) Int. Cl.
*B62D 35/00* (2006.01)
(52) U.S. Cl.
CPC ......... *B62D 35/001* (2013.01); *B62D 35/005* (2013.01)

(58) Field of Classification Search
CPC ..... B62D 35/001; B62D 35/005; B62D 37/02
See application file for complete search history.

(56) References Cited

U.S. PATENT DOCUMENTS

| | | | |
|---|---|---|---|
| 4,095,835 | A | 6/1978 | Ensor |
| 4,458,937 | A | 7/1984 | Beckmann et al. |
| 2019/0367102 | A1 | 12/2019 | Haban et al. |

FOREIGN PATENT DOCUMENTS

| | | |
|---|---|---|
| CN | 102465938 A | 5/2012 |
| CN | 110843712 A | 2/2020 |

(Continued)

OTHER PUBLICATIONS

English Abstract of TW201139131A Nov. 16, 2011 (Year: 2011).*

(Continued)

*Primary Examiner* — Lori Lyjak
(74) *Attorney, Agent, or Firm* — Withrow & Terranova, PLLC

(57) ABSTRACT

A vehicle including an attachment for attaching a cargo transporting member thereto, wherein the vehicle further includes a wind deflector for deflecting wind from the cargo transporting member when being attached to the vehicle, wherein the wind deflector includes two or more wind deflector portions which are configured to deflect wind when the vehicle is travelling in a travelling direction, wherein the wind deflector is configured to be expanded into at least a first wind deflecting state and collapsed into a collapsed state, wherein the two or more wind deflector portions are configured to be pivoted relative each other with respect to a common rotational axis so that the wind deflector is expanded and collapsed between the first wind deflecting state and the collapsed state.

22 Claims, 8 Drawing Sheets

(56) References Cited

FOREIGN PATENT DOCUMENTS

DE     102013008593 A1    12/2014
TW       201139191 A  *  11/2011
WO      2018083691 A1     5/2018

OTHER PUBLICATIONS

IL 248771 B with English translation (Year: 2018).*
Extended European Search Report for European Patent Application No. 20177736.4, mailed Nov. 13, 2020, 6 pages.
International Search Report and Written Opinion for International Patent Application No. PCT/EP2021/064650, mailed Aug. 6, 2021, 13 pages.
First Office Action for Chinese Patent Application No. 202180037502.X, mailed Jan. 13, 2025, 19 pages.

* cited by examiner

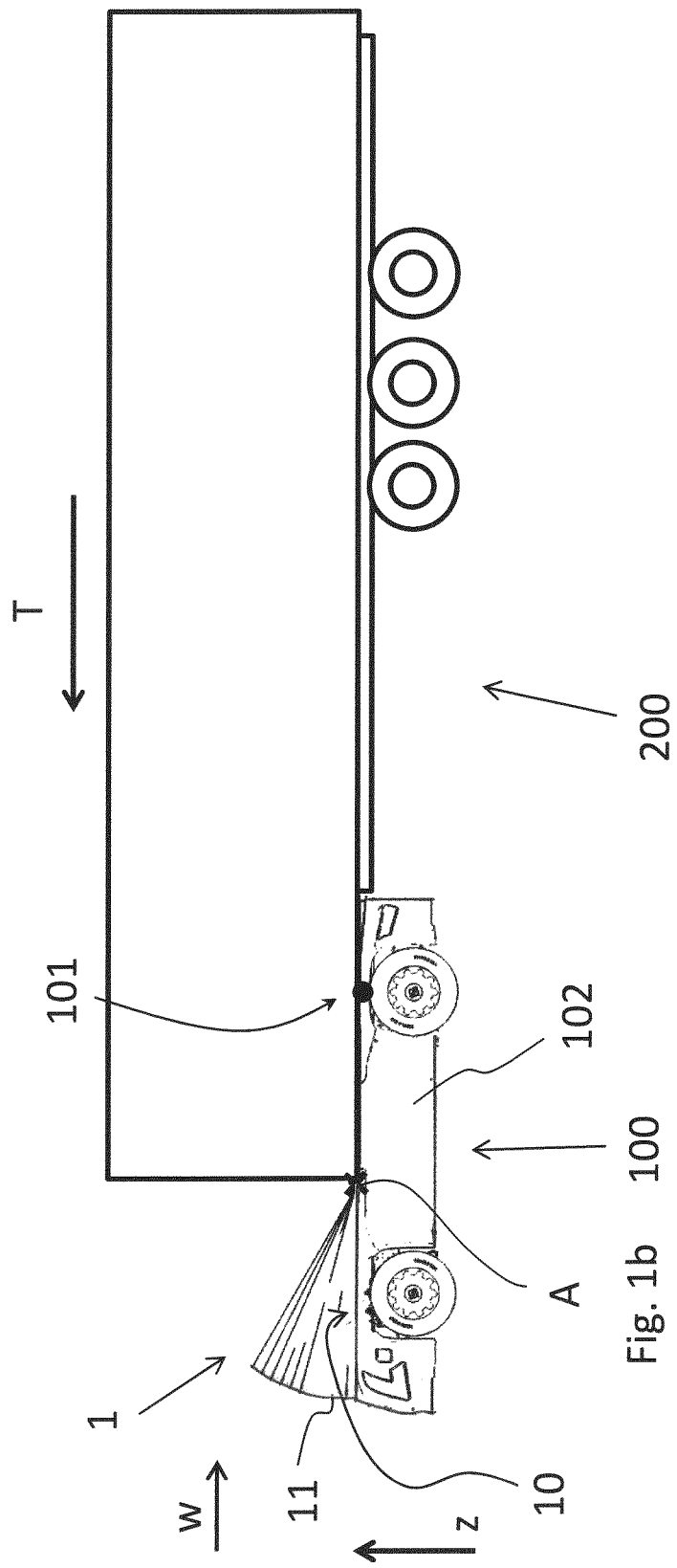

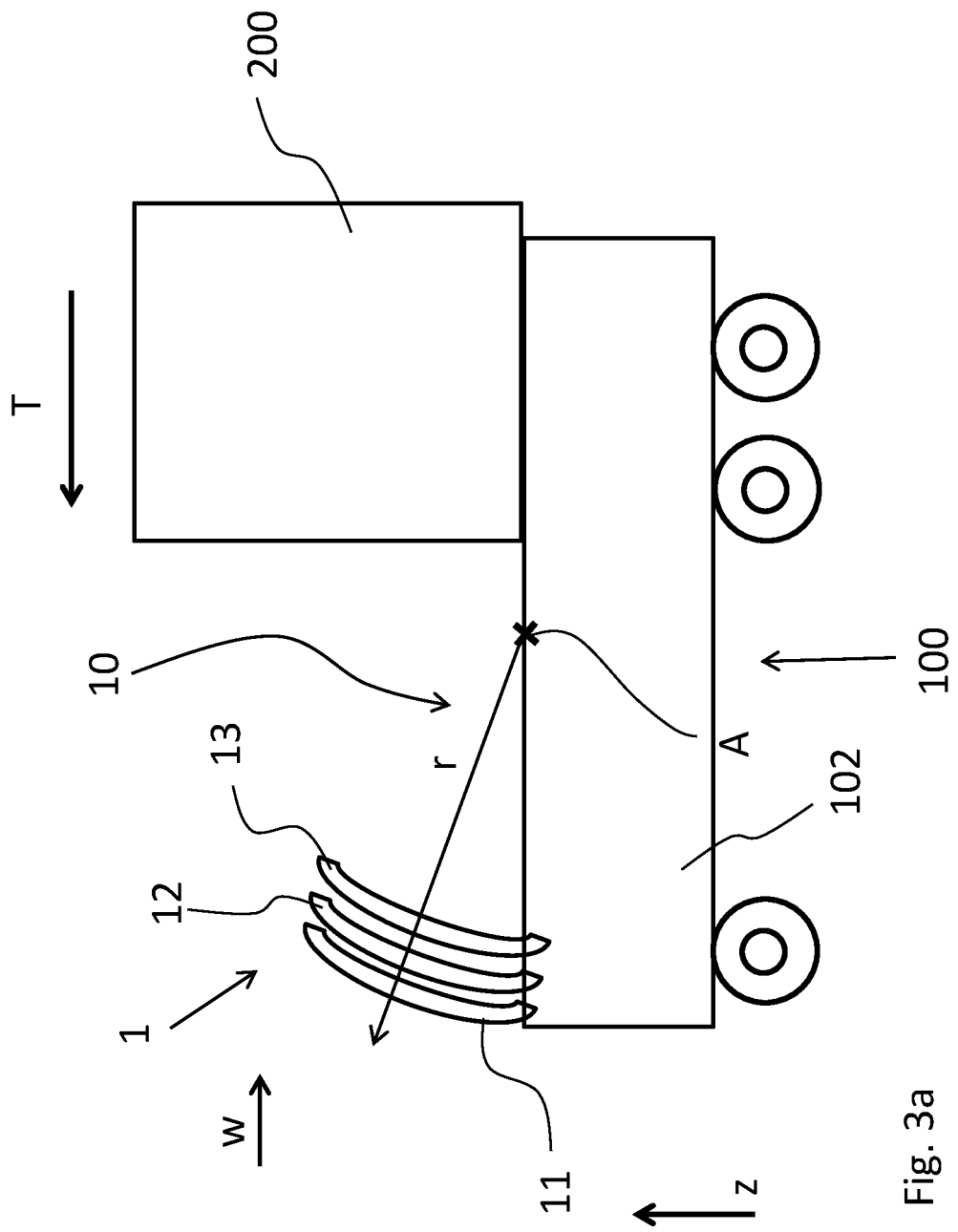

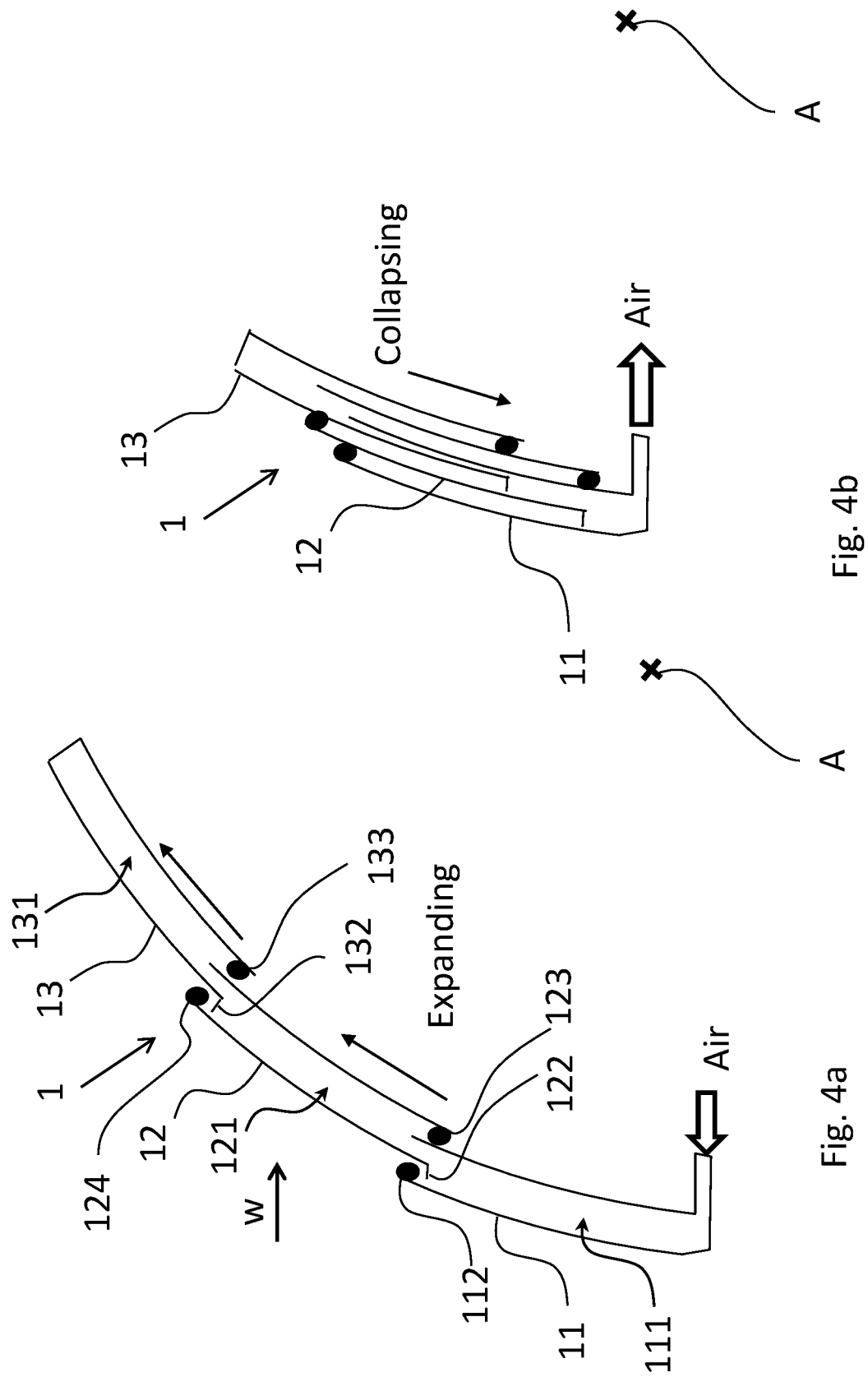

VEHICLE

This application is a 35 USC 371 national phase filing of International Application No. PCT/EP2021/064650, filed Jun. 1, 2021, which claims the benefit of European Patent Application No. 20177736.4, filed Jun. 2, 2020, the disclosures of which are incorporated herein by reference in their entireties.

TECHNICAL FIELD

The invention relates to a vehicle comprising means for attaching a cargo transporting member thereto, wherein the vehicle further comprises a wind deflector for deflecting wind from the cargo transporting member when being attached to the vehicle.

The invention can be applied in heavy-duty vehicles, such as trucks, buses and construction equipment. Although the invention will be described with respect to an autonomous vehicle, the invention is not restricted to this particular vehicle, but may also be used in other vehicles such as semi-autonomous vehicles or non-autonomous vehicles, including trucks, towing tractors etc.

BACKGROUND

Cargo transporting members for vehicles, including trailer vehicles and cargo containers, are generally designed to maximize its filling capacity. This leads to a box shaped design which likely provides negative aerodynamic effects during transportation, which in turn may result in increased power usage during operation of the vehicle.

In order to reduce the negative aerodynamic effects it is known to provide wind deflectors on the vehicles which deflect air from e.g. a trailer vehicle which is connected to the vehicle. The vehicle may for example be a towing truck which is provided with a wind deflector on the roof of the driver cabin of the truck.

It is expected that it will become increasingly common to use autonomous vehicles on public roads and in confined areas to transport cargo transporting members at driving speeds which will be similar to driving speeds of manually operated vehicles. For example, the autonomous vehicles may operate at speeds as high as highway driving speeds. These autonomous vehicles may be provided without a driver cabin, and therefore the need for using wind deflectors may increase for these types of vehicles.

US 2019/0367102 A1 discloses a movable front shield for an autonomous vehicle, wherein the front shield can be moved from a closed position to an opened position when a cargo container is attached to the vehicle.

Even though it is known to provide wind deflectors which are adjustable, there is still a strive towards developing improved vehicle wind deflectors. This is especially notable for autonomous vehicles where it is expected that the frontal area of the cargo transporting members to cover is excessively large, and that therefore the need for adjustment of the deflector position is increasingly frequent.

SUMMARY

An object of the invention is to provide an improved vehicle comprising means for attaching a cargo transporting member thereto, wherein the vehicle further comprises a wind deflector for deflecting wind from the cargo transporting member when being attached to the vehicle.

The object is achieved by a vehicle according to claim 1. Thus, the object is achieved by a vehicle comprising means for attaching a cargo transporting member thereto, wherein the vehicle further comprises a wind deflector for deflecting wind from the cargo transporting member when being attached to the vehicle, wherein the wind deflector comprises:

two or more wind deflector portions which are configured to deflect wind when the vehicle is travelling in a travelling direction, wherein the wind deflector is configured to be expanded into at least a first wind deflecting state and collapsed into a collapsed state, wherein the two or more wind deflector portions are configured to be pivoted relative each other with respect to a common rotational axis so that the wind deflector is expanded and collapsed between the first wind deflecting state and the collapsed state.

Further, the wind deflector is preferably arranged such that the common rotational axis is at least provided behind the two or more wind deflector portions when the wind deflector is in the collapsed state, as seen with respect to the travelling direction. The wind deflector is further preferably provided on an upwardly facing surface of the vehicle. Preferably, the upwardly facing surface is a top surface and/or a roof surface of the vehicle, i.e. it is not part of any vertical side surface of the vehicle. Still optionally, the wind deflector may be arranged such that the common rotational axis is also provided behind the two or more wind deflector portions when the wind deflector is in the first wind deflecting state. Still optionally, the wind deflector may be arranged such that the two or more wind deflector portions extend forwardly in the travelling direction T and upwardly from the common rotational axis A when the wind deflector is in the first wind deflecting state.

Further advantages and advantageous features of the invention are disclosed in the following description and in the dependent claims.

By the provision of a vehicle as disclosed herein, an improved wind deflector for the vehicle is provided. More specifically, providing the wind deflector with two or more wind deflector portions which are pivotable as disclosed herein implies increased versatility of the vehicle and a space saving configuration. For example, the configuration may allow for adjusting the size of a wind deflecting surface of the wind deflector depending on the size of the cargo transporting member, and/or depending on the travelling speed of the vehicle. As another example, the configuration of the wind deflector may allow for compact storage, e.g. storing the wind deflector in a reduced space when the wind deflector is provided in its collapsed state. Prior art designs have shown to be more difficult to store when they are not used for deflecting wind. For example, it is known to store prior art wind deflectors in large cavities of the vehicle. By the provision of the wind deflector as disclosed herein, storing the wind deflector on the vehicle when it is in its collapsed state will be facilitated. As yet another example, by the provision of the present invention, increased versatility may be provided in that the wind deflector can be adjusted to different states. This may allow the wind deflector for deflecting wind, but also for other purposes, including but not limited to increasing wind resistance, communicative purposes, safety etc. Furthermore, by the provision of the present invention, and in particular by providing the common rotational axis behind the two or more wind deflector portions as mentioned in the above, a smoother transition between the wind deflector and the cargo transporting member can be achieved. For example, said configuration may allow for an almost tangential transition between the wind deflector and the cargo transporting member when the wind deflector is provided in the wind deflecting state. In prior art designs, the transition between the wind deflector and the cargo transporting member has rather resulted in a sharper angle therebetween. In addition, the wind deflector of the present invention has shown to be especially advantageous when there is a relatively large difference in height between the upwardly facing surface on which the wind deflector is provided and a top surface of the cargo transporting member.

The common rotational axis may be geometrically fixed in relation to the vehicle, meaning that when the relative pivoting motion is occurring between the at least two wind deflector portions, the common rotational axis is provided at a constant distance with respect to the vehicle body, i.e. the chassis unit of the vehicle.

At least one of the two or more wind deflector portions may be pivotally mounted to the vehicle at the common rotational axis. Still further, one of the two or more wind deflector portions may be non-pivotally mounted to the vehicle at the common rotational axis. In such a case, one of the two or more wind deflector portions may be non-pivotally mounted to the vehicle at the common rotational axis whilst at least one other wind deflector portion(s) may be pivotally mounted to the vehicle at the common rotational axis. As yet another example, the two or more wind deflector portions may be pivotally mounted to the vehicle at the common rotational axis.

The expression "collapsed state" as used herein means a state where the wind deflector's exposed surface area is minimized and/or where the wind deflector's wind deflection capability is reduced or minimized. Additionally, or alternatively, the expression "collapsed state" means a state where the wind deflector is in a closed position. The "first wind deflecting state" as used herein may mean a state where the wind deflector is expanded to its maximum wind deflecting state. Additionally, or alternatively, the first wind deflecting state may also be denoted an open state of the wind deflector, such as a fully open, or completely expanded, state of the wind deflector.

As mentioned in the above, a "cargo transporting member" means a member for transporting cargo, including a trailer vehicle and/or a cargo container, such as a shipping container and an ISO (International Organization for Standardization) container. A trailer vehicle may for example be a semi-trailer, a dump-trailer or the like for a truck.

Optionally, the two or more wind deflector portions may be separate members. Providing the wind deflector portions as separate members implies further increased versatility. Still optionally, the two or more wind deflector portions may be in the form of lamellas and/or shells. Thereby, a more slim and light-weight configuration may be provided. Still further, the use of lamellas and/or shells may result in a robust and reliable configuration. Still optionally, each one of the two or more wind deflector portions may be a self-supporting structure, such as self-supporting shells and/or lamellas.

Optionally, the two or more wind deflector portions may be configured to be stackable in the collapsed state so that they are at least partly overlapping each other in a radial direction with respect to the common rotational axis. This may result in increased compactness when the wind deflector is provided into its collapsed state.

Optionally, the wind deflector may be configured to be in a third state where there is an open gap between at least two of the two or more wind deflector portions, allowing wind to enter the gap when the vehicle is travelling in the travelling direction. This implies increased versatility, allowing e.g. to selectively adjust the wind resistance during travelling according to current requirements. For example, in certain situations, such as during downhill travelling, it may be desired to increase the wind resistance in order to reduce vehicle speed and/or acceleration.

Optionally, the two or more wind deflector portions may comprise a canvas member which forms a wind deflecting surface when the wind deflector is expanded into the first wind deflecting state. A canvas, such as a canvas canopy, is known per se by the skilled person, but may for example be in the form a piece of fabric or the like, similar to material for a tent or the like. The canvas member shall of course be fit for purpose and be able to withstand forces acting thereon when deflecting air without being damaged. The collapsed state may be even more compact by providing a canvas member.

Optionally, at least one pair of two consecutively arranged wind deflector portions of the two or more wind deflector portions may be connectable to each other so that one wind deflector portion thereof pulls on the other wind deflector portion when the wind deflector is expanded to the first wind deflecting state. This may imply a facilitated opening of the wind deflector. Still optionally, the at least one pair of two consecutively arranged wind deflector portions may further be connectable to each other so that one wind deflector portion thereof pulls on the other wind deflector portion when the wind deflector is collapsed to the collapsed state. Consequently, this may imply a facilitated closing of the wind deflector, i.e. when the wind deflector is provided to its collapsed state. Still yet optionally, the wind deflector may further comprise at least one intermediate engagement portion for the at least one pair of two consecutively arranged wind deflector portions, wherein the at least one intermediate engagement portion is configured so that one wind deflector portion of the at least one pair of two consecutively arranged wind deflector portions pulls on the other wind deflector portion thereof when the wind deflector is expanded to the first wind deflecting state, and/or wherein the at least one intermediate engagement portion is configured so that one wind deflector portion of the at least one pair of two consecutively arranged wind deflector portions pulls on the other wind deflector portion thereof when the wind deflector is collapsed to the collapsed state.

Optionally, the two or more wind deflector portions, when being in the first wind deflecting state, may be configured to form a continuous curve-shaped outer peripheral wind deflecting surface facing the direction of the wind which is opposite to the travelling direction, as seen in a sectional plane being perpendicular to the common rotational axis. Preferably, the continuous curve-shaped outer peripheral wind deflecting surface is forming a convex form facing the direction of the wind as seen in the sectional plane being perpendicular to the common rotational axis. Still optionally, the wind deflecting surface facing the direction of the wind may also be configured to form a convex outer peripheral wind deflecting surface, as seen in a sectional plane being defined by the common rotational axis.

Still optionally, the continuous curve-shaped outer peripheral wind deflecting surface may comprise a human machine interface configured to provide adaptable visual information to an ambient surrounding. As such, the wind deflector may be used as a means for communication to other parties, such as other road users.

Optionally, at least one of the two or more wind deflector portions may comprise at least one air pocket which is configured to be filled with pressurized air for expanding the at least one wind deflector portion and to be emptied from pressurized air for collapsing the at least one wind deflector portion. Such configuration has been found to be an efficient solution for expanding and collapsing the wind deflector, implying a cost-efficient solution and also a time-efficient solution for expanding and collapsing the wind deflector.

Optionally, the vehicle may further comprise a control unit configured for controlling expanding and collapsing of the wind deflector. Accordingly, the wind deflector may preferably be automatically controlled, even though also manual control may be feasible.

Optionally, the control unit may be configured to expand the wind deflector to an expanded emergency state when it is determined that a collision of the vehicle with an external object is occurring or is about to occur. According to an example embodiment, the expanded emergency state is the first wind deflecting state. It has namely been found that the wind deflector may additionally be advantageously used for e.g. protecting pedestrians, bicyclists etc. during a collision between the vehicle and the pedestrian and/or the bicyclist. More specifically, this has been found to be particularly advantageous when the wind deflector is mounted in the front of the vehicle and closer to the ground surface on the vehicle, such as on a chassis unit on the vehicle, as mentioned herein. Put differently, the wind deflector may be controlled by the control unit to function similarly to a conventional airbag, i.e. it is rapidly expanded when a collision is imminent.

Optionally, the control unit may be configured to collapse the wind deflector to a collapsed wind resistance state when it is determined that an acceleration of the vehicle is above a predefined threshold value and/or when it is determined that the vehicle is travelling in a downhill slope. The collapsed wind resistance state is preferably the collapsed state as mentioned in the above, i.e. it may be the closed position of the wind deflector. Alternatively, the collapsed wind resistance state may be an intermediate state between a completely expanded state and the closed position. As such, the control unit may adjust the wind deflector state to a state corresponding to a desired wind resistance for the actual situation in order to reach a desired speed, or at least to reduce the acceleration of the vehicle.

Optionally, the control unit may be configured to expand the wind deflector to an expanded wind resistance state configured to provide at least one open gap for wind below at least one of the two or more wind deflector portions when it is determined that an acceleration of the vehicle is above a predefined threshold value and/or when it is determined that the vehicle is travelling in a downhill slope. The word below means here below the at least one of the two or more wind deflector portions, as seen in relation to a vertical, or height, axis of the vehicle.

Optionally, the control unit may be configured to individually control the pivoting motion of the wind deflector portions. Thereby further increased versatility may be provided, allowing the wind deflector to be provided into a plurality of different states, including both wind deflecting states and states where wind resistance may be increased.

Preferably, the vehicle is an autonomous vehicle. An autonomous vehicle means a vehicle which can be driven without a driver present aboard the vehicle. As such, the autonomous vehicle may be completely autonomous in the sense that no human is involved in providing steering, propulsion and braking commands to the vehicle during driving. Rather, the autonomous vehicle may comprise a vehicle control system for providing motion control of the vehicle. The control system may comprise one or more control units. Alternatively, the vehicle may be a remotely controlled vehicle. A remotely controlled vehicle may be remotely controlled by a human.

The vehicle may be any one of an electric vehicle, a vehicle comprising an internal combustion engine and a hybrid vehicle.

Optionally, the common rotational axis preferably extends in a direction which is substantially parallel to a transverse direction of the vehicle.

Optionally, the vehicle may further comprise at least one perception sensor, such as a LIDAR (Light Detection and Ranging), RADAR (Radio Detection and Ranging), camera or the like, wherein the at least one perception sensor is provided behind at least one of the wind deflector portions, as seen in the travelling direction. Thereby, the perception sensor may be efficiently protected from e.g. debris which otherwise could damage or reduce the sensor capacity during driving of the vehicle. The at least one perception sensor may for example be a perception sensor of the aforementioned autonomous vehicle, and particularly for the aforementioned vehicle control system for providing motion control of the vehicle. Still optionally, the vehicle may further comprise at least one antenna, such as a global navigation satellite system (GNSS) antenna, wherein the at least one antenna is provided behind at least one of the wind deflector portions, as seen in the travelling direction. Thereby, the at least antenna can also be efficiently protected from e.g. debris during driving of the vehicle, especially when the wind deflector is in the wind deflecting state. Still optionally, the vehicle may further comprise an object which is provided behind at least one of the wind deflector portions, as seen in the travelling direction, and also provided at the upwardly facing surface, wherein the wind deflector is adapted to protect the object at least when the wind deflector is in the wind deflecting state. The object may for example be an exchangeable battery unit for the vehicle, which can be protected from e.g. debris during driving of the vehicle.

Preferably, the wind deflector is positioned on a chassis unit of the vehicle. For example, the vehicle may not be equipped with a driver cabin. The wind deflector as disclosed herein has shown to be particularly advantageous for such type of vehicle, since a cabin-less vehicle may have an increased need for a more versatile, adjustable and compact wind deflector. Especially, arranging the wind deflector such that it at least has the common rotational axis behind the two or more wind deflector portions when the wind deflector is in the collapsed state has shown to provide a compact configuration for a cabin-less vehicle as e.g. disclosed herein. In addition, this configuration has also shown to enable for an improved aerodynamic transition area between the wind deflector and the cargo transporting member when the wind deflector is in the first wind deflecting state. For example, the wind deflector may thereby be arranged such that a top portion thereof contacts, or is in the proximity of, the cargo transporting member when the wind deflector is in the first wind deflecting state. Thereby, an almost tangential transition between the wind deflector and the cargo transporting member may be achieved.

The cabin-less vehicle, i.e. a vehicle which is free from a vehicle cabin, preferably comprises an upwardly facing surface, which preferably forms an upwardly facing top surface and/or roof surface of the cabin-less vehicle. An upwardly facing surface means herein a surface which is facing upwardly, as seen when the vehicle is provided on a flat horizontally extending surface, such as a horizontal road surface. The upwardly facing surface at which the wind deflector is provided is preferably located in front of the cargo transporting member when it is attached to the vehicle, as seen in the travelling direction of the vehicle.

Optionally, the wind deflector may comprise an additional protecting cover, wherein the additional protecting cover is configured such that it can be expanded from the wind deflector when the wind deflector is in the wind deflecting state and along an extension of the vehicle in the opposite direction to the vehicle's travelling direction. Thereby, the additional protecting cover may cover at least an additional portion of the vehicle and/or at least a portion of the cargo transporting member. Accordingly, in addition to deflect wind, the wind deflector may also be used to cover objects which are provided further behind on the vehicle.

In the following, possible features and feature combinations of embodiments of the disclosure are presented in item structure and form part of this disclosure:

1. A vehicle (100) comprising means (101) for attaching a cargo transporting member (200) thereto, wherein the vehicle further comprises a wind deflector (1) for deflecting wind from the cargo transporting member when being attached to the vehicle, wherein the wind deflector (1) comprises:
   two or more wind deflector portions (11, 12, 13, 14, 15, 16) which are configured to deflect wind (w) when the vehicle is travelling in a travelling direction (T),
   wherein the wind deflector is configured to be expanded into at least a first wind deflecting state and collapsed into a collapsed state, characterized in that
   the two or more wind deflector portions are configured to be pivoted relative each other with respect to a common rotational axis (A) so that the wind deflector is expanded and collapsed between the first wind deflecting state and the collapsed state.
2. The vehicle (100) according to item 1, wherein the two or more wind deflector portions (11, 12, 13) are separate members.
3. The vehicle (100) according to item 2, wherein the two or more wind deflector portions (11, 12, 13) are in the form of lamellas and/or shells.
4. The vehicle (100) according to any one of the preceding items, wherein the two or more wind deflector portions (11, 12, 13) are configured to be stackable in the collapsed state so that they are at least partly overlapping each other in a radial direction (r) with respect to the common rotational axis (A).
5. The vehicle (100) according to any one of the preceding items, wherein the wind deflector (1) is configured to be in a third state where there is an open gap between at least two of the two or more wind deflector portions, allowing wind to enter the gap when the vehicle (100) is travelling in the travelling direction (T).
6. The vehicle (100) according to item 1, wherein the two or more wind deflector portions comprise a canvas member (17) which forms a wind deflecting surface when the wind deflector is expanded into the first wind deflecting state.
7. The vehicle (100) according to any one any one of the preceding items, wherein at least one pair of two consecutively arranged wind deflector portions of the two or more wind deflector portions (11, 12, 13, 14, 15, 16) are connectable to each other so that one wind deflector portion thereof pulls on the other wind deflector portion when the wind deflector is expanded to the first wind deflecting state.
8. The vehicle (100) according to item 7, wherein the at least one pair of two consecutively arranged wind deflector portions are further connectable to each other so that one wind deflector portion thereof pulls on the other wind deflector portion when the wind deflector is collapsed to the collapsed state
9. The vehicle (100) according to any one of items 7-8, wherein the wind deflector further comprises at least one intermediate engagement portion (122, 132) for the at least one pair of two consecutively arranged wind deflector portions, wherein the at least one intermediate engagement portion is configured so that one wind deflector portion of the at least one pair of two consecutively arranged wind deflector portions pulls on the other wind deflector portion thereof when the wind deflector is expanded to the first wind deflecting state, and/or wherein the at least one intermediate engagement portion is configured so that one wind deflector portion of the at least one pair of two consecutively arranged wind deflector portions pulls on the other wind deflector portion thereof when the wind deflector is collapsed to the collapsed state.
10. The vehicle (100) according to any one of the preceding items, wherein the two or more wind deflector portions, when being in the first wind deflecting state, are configured to form a continuous curve-shaped outer peripheral wind deflecting surface facing the direction of the wind (w) which is opposite to the travelling direction (T), as seen in a sectional plane being perpendicular to the common rotational axis (A).
11. The vehicle (100) according to item 10, wherein the continuous curve-shaped outer peripheral wind deflecting surface comprises a human machine interface (HMI) configured to provide adaptable visual information to an ambient surrounding.
12. The vehicle (100) according to any one of the preceding items, wherein at least one of the two or more wind deflector portions comprises at least one air pocket (111, 121, 131) which is configured to be filled with pressurized air for expanding the at least one wind deflector portion and to be emptied from pressurized air for collapsing the at least one wind deflector portion.
13. The vehicle (100) according to any one of the preceding items, further comprising a control unit configured for controlling expanding and collapsing of the wind deflector (1).
14. The vehicle (100) according to item 13, wherein the control unit is configured to expand the wind deflector (1) to an expanded emergency state when it is determined that a collision of the vehicle with an external object is occurring or is about to occur.
15. The vehicle (100) according to any one of item 13 or 14, wherein the control unit is configured to collapse the wind deflector (1) to a collapsed wind resistance state when it is determined that an acceleration of the vehicle is above a predefined threshold value and/or when it is determined that the vehicle is travelling in a downhill slope.
16. The vehicle (100) according to any one of item 13 or 14, wherein the control unit is configured to expand the wind deflector to an expanded wind resistance state configured to provide at least one open gap for wind below at least one of the two or more wind deflector portions when it is determined that an acceleration of the vehicle is above a predefined threshold value and/or when it is determined that the vehicle is travelling in a downhill slope.

17. The vehicle (100) according to any one of items 13-16, wherein the control unit is configured to individually control the pivoting motion of the wind deflector portions.
18. The vehicle (100) according to any one of the preceding items, wherein the vehicle is an autonomous vehicle.
19. The vehicle (100) according to any one of the preceding items, wherein the common rotational axis (A) extends in a direction which is substantially parallel to a transverse direction of the vehicle.
20. The vehicle (100) according to any one of the preceding items, further comprising at least one perception sensor, such as a LIDAR, RADAR, camera or the like, wherein the at least one perception sensor is provided behind at least one of the wind deflector portions, as seen in the travelling direction (T).
21. The vehicle (100) according to any one of the preceding items, wherein the wind deflector (1) is positioned on a chassis unit (102) of the vehicle.

BRIEF DESCRIPTION OF THE DRAWINGS

With reference to the appended drawings, below follows a more detailed description of embodiments of the invention cited as examples.

In the drawings:

FIGS. 1a-b show side views of a vehicle according to an embodiment of the present invention;

FIGS. 3a-c show sectional side views of a vehicle according to embodiments of the present invention;

FIGS. 4a-b show schematic side views of a wind deflector according to example embodiments of the present invention.

Figure 1A:
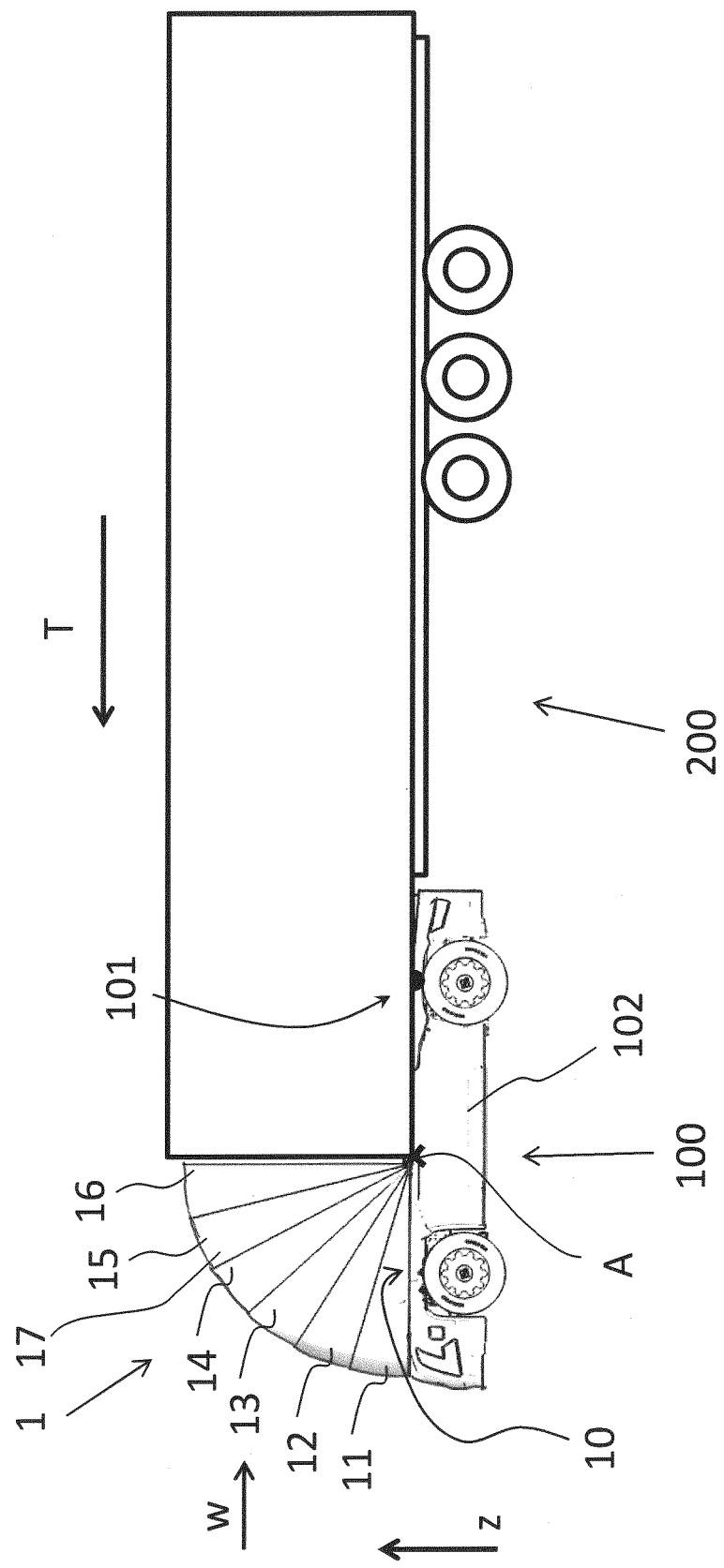

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIGS. 1a-b show side views of a vehicle 100 according to an example embodiment of the present invention. The vehicle 100 is here in the form of an autonomous truck without any driver cabin, i.e. the vehicle 100 is free from a vehicle cabin. Even though the present invention has shown to be suitable for such type of vehicle, the present invention is also applicable to other types of vehicles, such as other types of autonomous vehicles, other types of trucks, buses, construction equipment etc.

The vehicle 100 comprises means 101 for attaching a cargo transporting member 200 thereto. The means 101 for attaching the cargo transporting member 200 is here in the form of a coupling member for attaching a trailer vehicle. Accordingly, the cargo transporting member 200 is here a trailer vehicle coupled to the vehicle 100. The trailer vehicle 200 as shown is a semi-trailer as already known by the skilled person.

The vehicle 100 further comprises a wind deflector 1 for deflecting wind from the cargo transporting member 200 when it is attached to the vehicle 100.

The wind deflector 1 comprises two or more wind deflector portions 11, 12, 13, 14, 15, 16 which are configured to deflect wind w when the vehicle 100 is travelling in a travelling direction T. Accordingly, the travelling speed of the vehicle 100 causes wind w on the vehicle 100 and on the trailer vehicle 200, wherein the wind deflector 1 is configured to deflect the wind w from the trailer vehicle 200. The direction of the wind w is substantially opposite to the travelling direction T. In the shown embodiment, there are six wind deflector portions 11, 12, 13, 14, 15, 16. It shall however be understood that any number of two or more wind deflector portions may be used, depending on e.g. the size of the vehicle, shape of the vehicle etc. Furthermore, the wind deflector 1 is configured to be expanded into at least a first wind deflecting state and collapsed into a collapsed state. FIG. 1a shows the first wind deflecting state, which here is a state where the wind deflector is completely expanded, i.e. in a completely open position. FIG. 1b, on the other hand, shows an example of the collapsed state, i.e. when the wind deflector is in a closed position.

The two or more wind deflector portions 11, 12, 13, 14, 15, 16 are configured to be pivoted relative each other with respect to a common rotational axis A so that the wind deflector is expanded and collapsed between the first wind deflecting state and the collapsed state. Thereby, the wind deflector 1 can be easily adjusted to e.g. the size of the trailer vehicle 200. Further, by collapsing the wind deflector 1 to its collapsed state, i.e. its closed position, with respect to the common rotational axis A, the wind deflector can be made small, enabling for example a reduced need for any type of storage space on the vehicle 100. Accordingly, by the provision of the wind deflector as disclosed herein, a compact and versatile wind deflector configuration is achieved. The common rotational axis A is as shown preferably extending in a transverse direction of the vehicle 1. The transverse direction is substantially perpendicular to the travelling direction T, and also substantially perpendicular to a vertical direction z, as seen when the vehicle 100 is provided on a flat horizontally extending surface. The travelling direction T corresponds to a longitudinal direction of the vehicle 100.

Figure 2A:
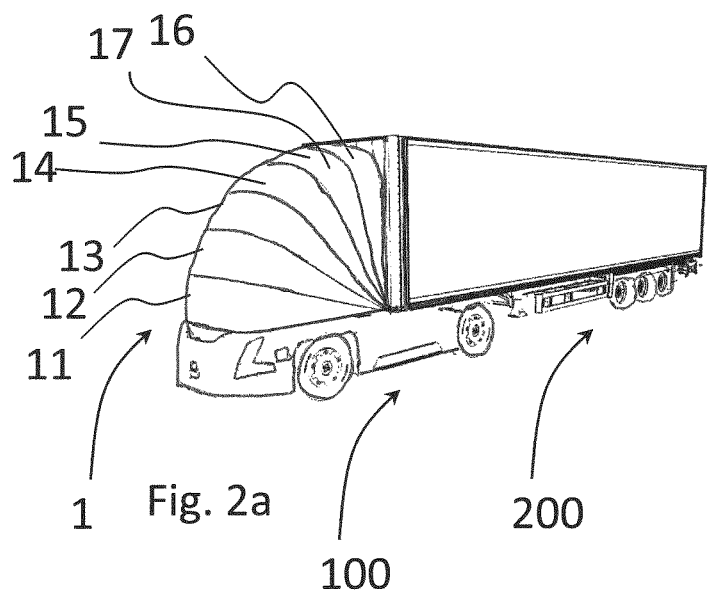
FIGS. 2a-b show perspective views of the vehicle as shown in FIGS. 1a-b.
Figure 2B:
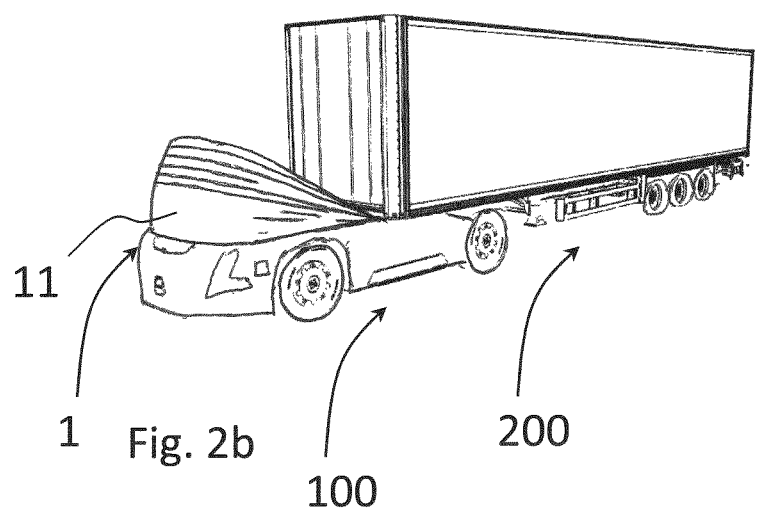

FIGS. 2a-b show perspective views of the vehicle 100 and the trailer vehicle 200 as shown in FIGS. 1a-b.

As shown in the embodiments in e.g. FIGS. 1a-b and 2a-b, the wind deflector 1 is preferably arranged such that the common rotational axis A is at least provided behind the two or more wind deflector portions 11, 12, 13, 14, 15, 16 when the wind deflector 1 is in the collapsed state. In other words, the wind deflector 1 is arranged such that the two or more wind deflector portions 11, 12, 13, 14, 15, 16 extend forwardly in the travelling direction T from the common rotational axis A, at least when the wind deflector 1 is in the collapsed state. Optionally, as shown in e.g. FIGS. 1a-d, the wind deflector 1 may be arranged such that the common rotational axis A is also provided behind the two or more wind deflector portions 11, 12, 13, 14, 15, 16 when the wind deflector 1 is in the first wind deflecting state. Still optionally, the wind deflector 1 may as also shown be arranged such that the two or more wind deflector portions 11, 12, 13, 14, 15, 16 extend forwardly in the travelling direction T and upwardly from the common rotational axis A when the wind deflector 1 is in the first wind deflecting state.

In addition, the wind deflector 1 is also preferably provided on an upwardly facing surface 10 of the vehicle 1. As such, the two or more wind deflector portions 11, 12, 13, 14, 15, 16 will extend along the upwardly facing surface 10 when the wind deflector 1 is provided in the collapsed state.

The wind deflector 1 is also as shown preferably provided in front of the cargo transporting member 200, as seen in the travelling direction T.

The wind deflector portions 11, 12, 13, 14, 15, 16 of the embodiments shown in FIGS. 1a-b and 2a-b may comprise a canvas member 17 which forms a wind deflecting surface when the wind deflector 1 is expanded into the first wind deflecting state. For example, the wind deflector portions 11, 12, 13, 14, 15, 16 may together retain an outer canvas member 17, or cover, which is made of a flexible material, such as fabric or the like. Each one of the wind deflector portions 11, 12, 13, 14, 15, 16 may in such a case comprise a reinforcing structure, such as pin structure or the like, which retains the cover.

Figure 3B:
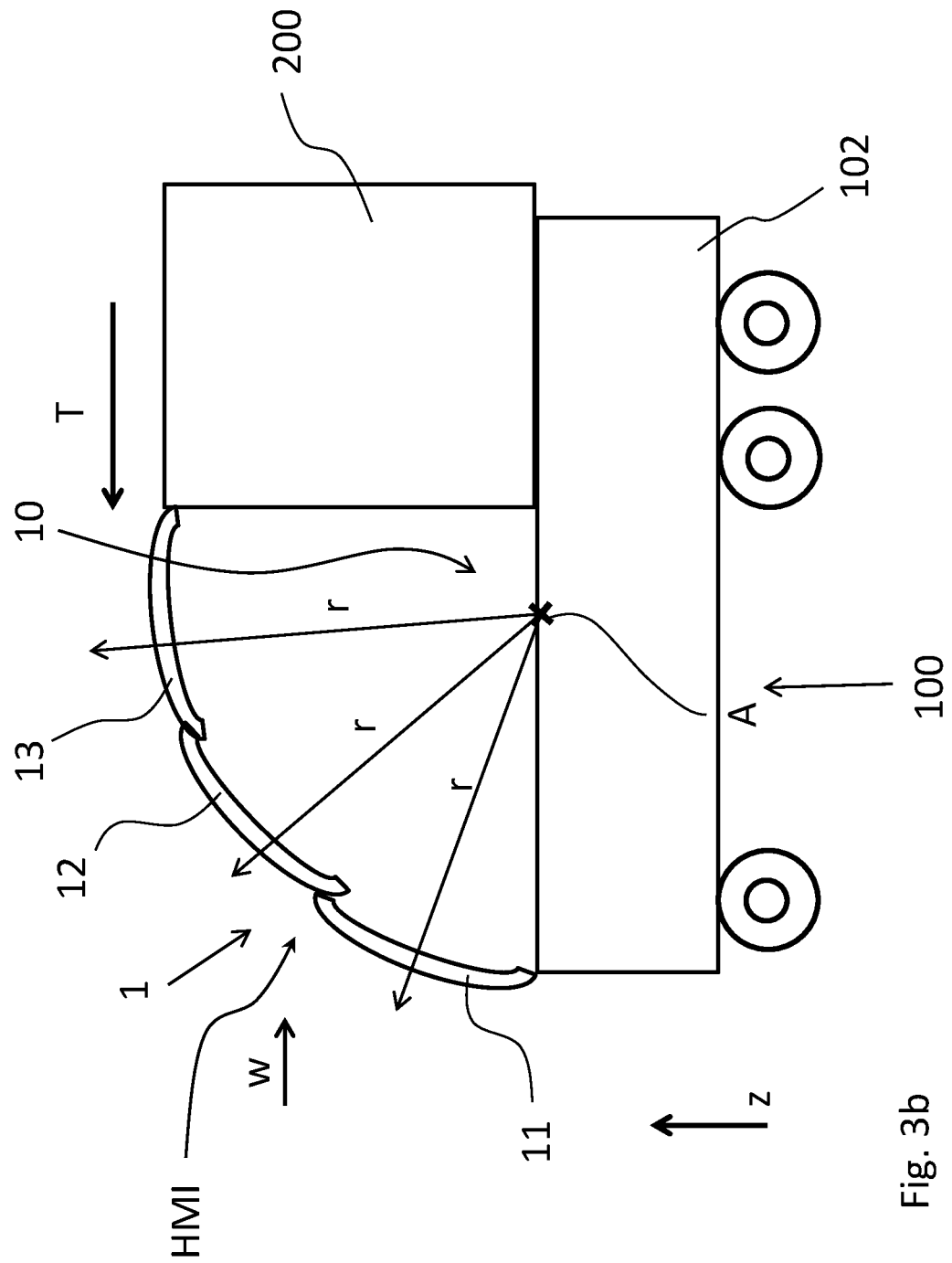
Figure 3C:
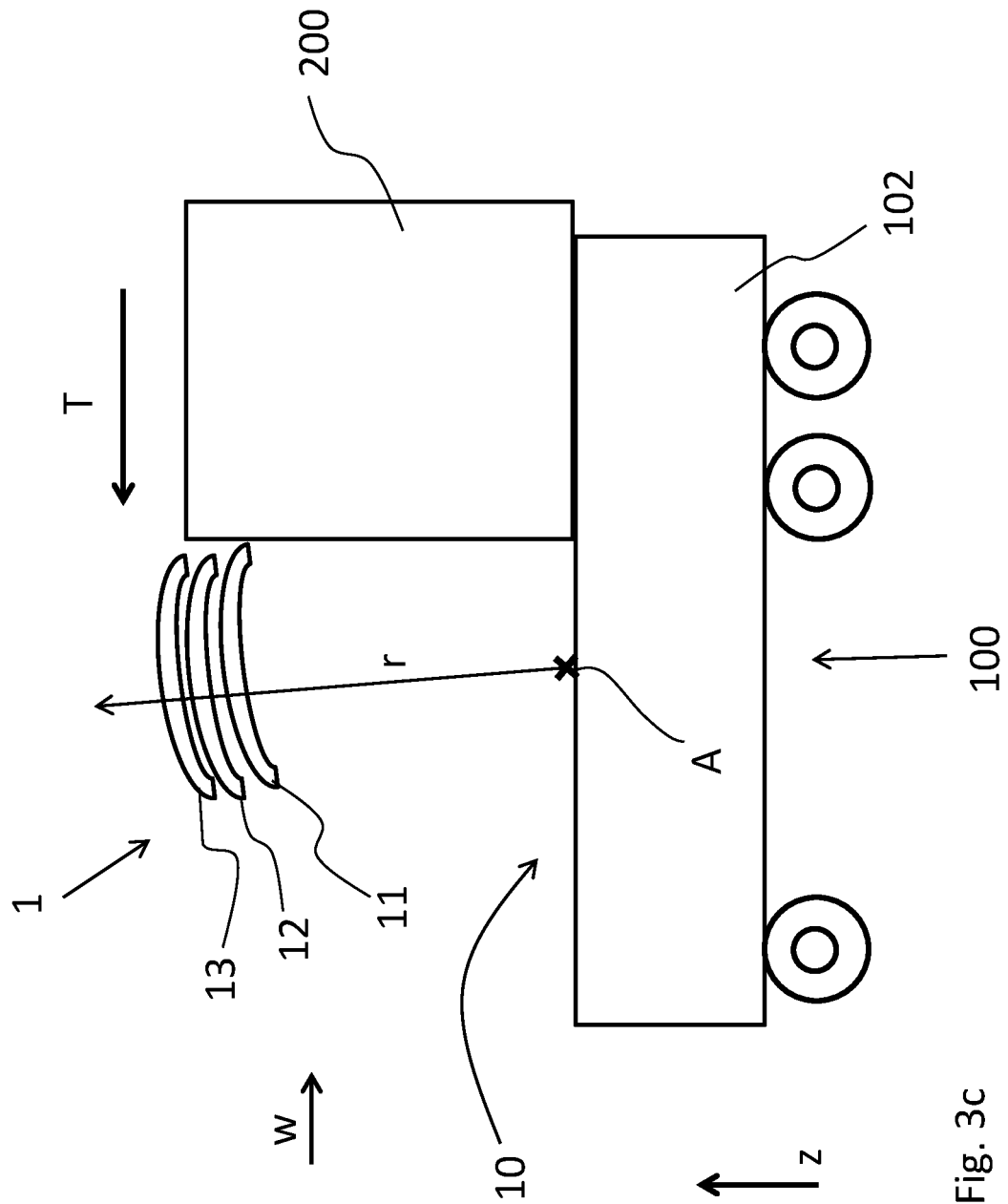

With respect to FIGS. 3a-c, other example embodiments of the present invention are shown. The embodiments show sectional side views of a vehicle 100. The sections correspond to a plane defined by the travelling direction T and the vertical direction z of the vehicle 100. The directions are similar to the directions described with reference to FIGS. 1a-b. The vehicle 100 is also here an autonomous vehicle, and a cabin-less vehicle, even though also non-autonomous vehicles and vehicles with driver cabins may be used. The vehicle 100, similar to the vehicle 100 in FIGS. 1a-b comprises wheels as ground engaging means, even though also other ground engaging means may be used, such as crawler members.

The vehicle 100 of FIGS. 3a-c comprises means (not shown) for attaching a cargo transporting member 200 thereto, wherein the vehicle 100 further comprises a wind deflector 1 for deflecting wind from the cargo transporting member 200 when being attached to the vehicle 100. In these embodiments, the cargo transporting member 200 is a container attached to the vehicle 100. The wind deflector 1 comprises two or more wind deflector portions 11, 12, 13 which are configured to deflect wind w when the vehicle is travelling in a travelling direction T. As shown, there are three wind deflector portions 11, 12, 13 in these embodiments. The wind deflector 1 is configured to be expanded into at least a first wind deflecting state (see FIG. 3b) and collapsed into a collapsed state (see FIG. 3a). The two or more wind deflector portions 11, 12, 13 are configured to be pivoted relative each other with respect to a common rotational axis A so that the wind deflector 1 is expanded and collapsed between the first wind deflecting state and the collapsed state.

The two or more wind deflector portions 11, 12, 14 are provided as separate members and further in the form of lamellas and/or shells.

In addition, as shown in FIG. 3a, the two or more wind deflector portions 11, 12, 13 may be configured to be stackable in the collapsed state so that they are at least partly overlapping each other in a radial direction r with respect to the common rotational axis A. Thereby efficient packaging of the wind deflector portions 11, 12, 13 can be provided, enabling a compact wind deflector 1 when being in the collapsed state.

As shown in e.g. FIG. 3b, the two or more wind deflector portions 11, 12, 13, when being in the first wind deflecting state, may be configured to form a continuous curve-shaped outer peripheral wind deflecting surface facing the direction of the wind w which is opposite to the travelling direction T, as seen in a sectional plane being perpendicular to the common rotational axis A. In the shown embodiment, the continuous curve-shaped outer peripheral wind deflecting surface is forming a convex form facing the direction of the wind w as seen in the sectional plane being perpendicular to the common rotational axis A. Furthermore, the continuous curve-shaped outer peripheral wind deflecting surface may comprises a human machine interface HMI configured to provide adaptable visual information to an ambient surrounding. For example, visual information may be projected on the continuous curve-shaped outer peripheral wind deflecting surface. For example, the visual information could be commercial information, such as advertising. Additionally, or alternatively, the visual information could be used for warning/informing other road users that the vehicle 100 is in operation and/or notify other road users of an identification of their presence and thereby infer a sense of mutual consent.

At least one pair of two consecutively arranged wind deflector portions of the two or more wind deflector portions, such as 12 and 13, may be connectable to each other so that one wind deflector portion thereof, 13, pulls on the other wind deflector portion, 12, when the wind deflector 1 is expanded to the first wind deflecting state. The at least one pair of two consecutively arranged wind deflector portions may further be connectable to each other so that one wind deflector portion thereof, 12, pulls on the other wind deflector portion, 13, when the wind deflector 1 is collapsed to the collapsed state. In order to realize the aforementioned configuration, the wind deflector 1 may further comprise at least one intermediate engagement portion (not shown) for the at least one pair of two consecutively arranged wind deflector portions, 12, 13, wherein the at least one intermediate engagement portion is configured so that one wind deflector portion 13 of the at least one pair of two consecutively arranged wind deflector portions pulls on the other wind deflector portion 12 thereof when the wind deflector 1 is expanded to the first wind deflecting state, and/or wherein the at least one intermediate engagement portion is configured so that one wind deflector portion 12 of the at least one pair of two consecutively arranged wind deflector portions pulls on the other wind deflector portion 13 thereof when the wind deflector 1 is collapsed to the collapsed state.

Additionally, or alternatively, the wind deflector 1 may be configured to be in a third state (not shown) where there is an open gap between at least two of the two or more wind deflector portions 11, 12, 13, allowing wind to enter the gap when the vehicle 100 is travelling in the travelling direction T.

The vehicle 100 as shown in FIGS. 1a-b, 2a-b and 3a-c may further comprise a control unit (not shown) configured for controlling expanding and collapsing of the wind deflector 1. The expanding and collapsing may be accomplished by use of an electric motor, or any other suitable means, which provides a rotating motion to the common rotational axis A. Additionally, or alternatively, the control unit may control pressurized air provided into air pockets as disclosed herein. The control unit may be formed as one control unit or as one or more connected sub-control units. Preferably, the control unit comprises a computer program configured for controlling expanding and collapsing of the wind deflector. The control unit may be connected to various sensors (not shown), such as vehicle speed sensor(s), wind measurement sensor(s), temperature sensor(s) etc., and configured to use information from said sensor(s) for controlling expanding and collapsing of the wind deflector 1. The control unit may also be configured to receive instructions, manually and/or automatically generated, for expanding and collapsing of the wind deflector 1. Additionally, or alternatively, the vehicle 100 may also comprise manual operating means for manually expanding and collapsing the wind deflector 1. For example, the manual operating means may comprise a lever or the like which a user can operate for expanding and collapsing the wind deflector 1.

The control unit may further be configured to expand the wind deflector 1 to an expanded emergency state, such as shown in FIG. 3b, when it is determined that a collision of the vehicle 100 with an external object is occurring or is about to occur. Still further, the control unit may be configured to collapse the wind deflector 1 to a collapsed wind resistance state, such as shown in FIG. 3a, when it is determined that an acceleration of the vehicle 100 is above a predefined threshold value and/or when it is determined that the vehicle 100 is travelling in a downhill slope.

The control unit may also be configured to expand the wind deflector 1 to an expanded wind resistance state, such as shown in FIG. 3c, configured to provide at least one open gap for wind below at least one of the two or more wind deflector portions 11, 12, 13, when it is determined that an acceleration of the vehicle 100 is above a predefined threshold value and/or when it is determined that the vehicle is travelling in a downhill slope. Thereby, efficient braking of the vehicle 100 may be provided.

The control unit may also be configured to individually control the pivoting motion of the wind deflector portions 11, 12, 13, 14, 15, 16. Thereby, increased flexibility is provided, allowing the wind deflector 1 to be provided in a plurality of different states, including both wind deflecting and wind resistance states.

Now, with respect to FIGS. 4a-b, another embodiment of a wind deflector 1 will be described. The figs. show sectional views of a wind deflector 1 of a vehicle (not shown). The sectional views are defined by a plane being perpendicular to the rotational axis A. Similar to the previously described embodiments, the wind deflector 1 comprises two or more wind deflector portions 11, 12, 13, which here are three such portions. At least one of the two or more wind deflector portions 11, 12, 13 comprises at least one air pocket 111, 121, 131 which is configured to be filled with pressurized air for expanding the at least one wind deflector portion 12, 13 and to be emptied from pressurized air for collapsing the at least one wind deflector portion 12, 13. In the shown embodiment, all of the wind deflector portions 11, 12, 13 comprise such air pockets, and two of the wind deflector portions, 12, 13 are expanded and collapsed when pressurized air is filled and emptied therein. The wind deflector portions 11, 12, 13 may as shown be made of a rigid material so that they substantially have the same form when filled and emptied with pressurized air. Alternatively, the wind deflector portions may be made of a flexible and/or collapsible material so that the form of the wind deflector portions changes when filled with pressurized air, similar to a balloon. As further shown in this embodiment, the wind deflector 1 further comprises intermediate engagement portions 122, 132 for at least one pair of two consecutively arranged wind deflector portions 11, 12 and/or 12, 13, wherein the at least one intermediate engagement portion 122, 132 is configured so that one wind deflector portion of the at least one pair of two consecutively arranged wind deflector portions pulls on the other wind deflector portion thereof when the wind deflector is expanded to the first wind deflecting state, as shown in FIG. 4a. The intermediate engagement portions 122, 132 may also as shown function as a stopping portion for preventing further relative expansion of the wind deflector portions 11, 12, 13. FIG. 4a shows the expanded state when the wind deflector is filled with pressurized air and FIG. 4b shows the collapsed state, or closed position, when the wind deflector is emptied from pressurized air. For example, pressurized air may be provided from an air compressor (not shown) of the vehicle 100. In addition, the wind deflector 1 of the shown embodiment comprises seal portions 112, 123, 124, 133 for preventing pressurized air from leaking out from the respective air pockets 111, 121, 131.

The vehicle 100 as shown in any one of the aforementioned embodiments may further comprise at least one perception sensor (not shown), such as a LIDAR, RADAR, camera or the like, wherein the at least one perception sensor is provided behind at least one of the wind deflector portions, as seen in the travelling direction T. In the event the at least one perception sensor is a visual perception sensor, i.e. a camera or LIDAR, the wind deflector portion covering the sensor may be provided with a transparent material in the sensor's field of view. For example, the transparent material may be a window. According to an example embodiment, another wind deflector portion may be configured to wipe the window when the wind deflector is expanded and/or collapsed, thereby cleaning the window from debris, water, snow etc. Additionally, or alternatively, the window may be cleaned by a separate wiper during use. By the above mentioned examples it can be assured that the functionality of the at least one perception sensor is maintained during driving of the vehicle.

As further shown in the embodiments described herein, the wind deflector 1 is preferably positioned on a chassis unit 102 of the vehicle 100 and not on e.g. a driver cabin. Still preferably, the wind deflector 1 is preferably provided on an upwardly facing surface 10 of the vehicle 100, and/or of the chassis unit 102. For example, the vehicle is preferably a cabin-less vehicle, i.e. a vehicle which is free from a vehicle cabin. Preferably, the wind deflector 1 is provided on the chassis unit 102 and/or on the upwardly facing surface 10 so that a smallest distance to ground is 0.5-2 meters, such as 0.5-1.5 meters.

Figure 5:
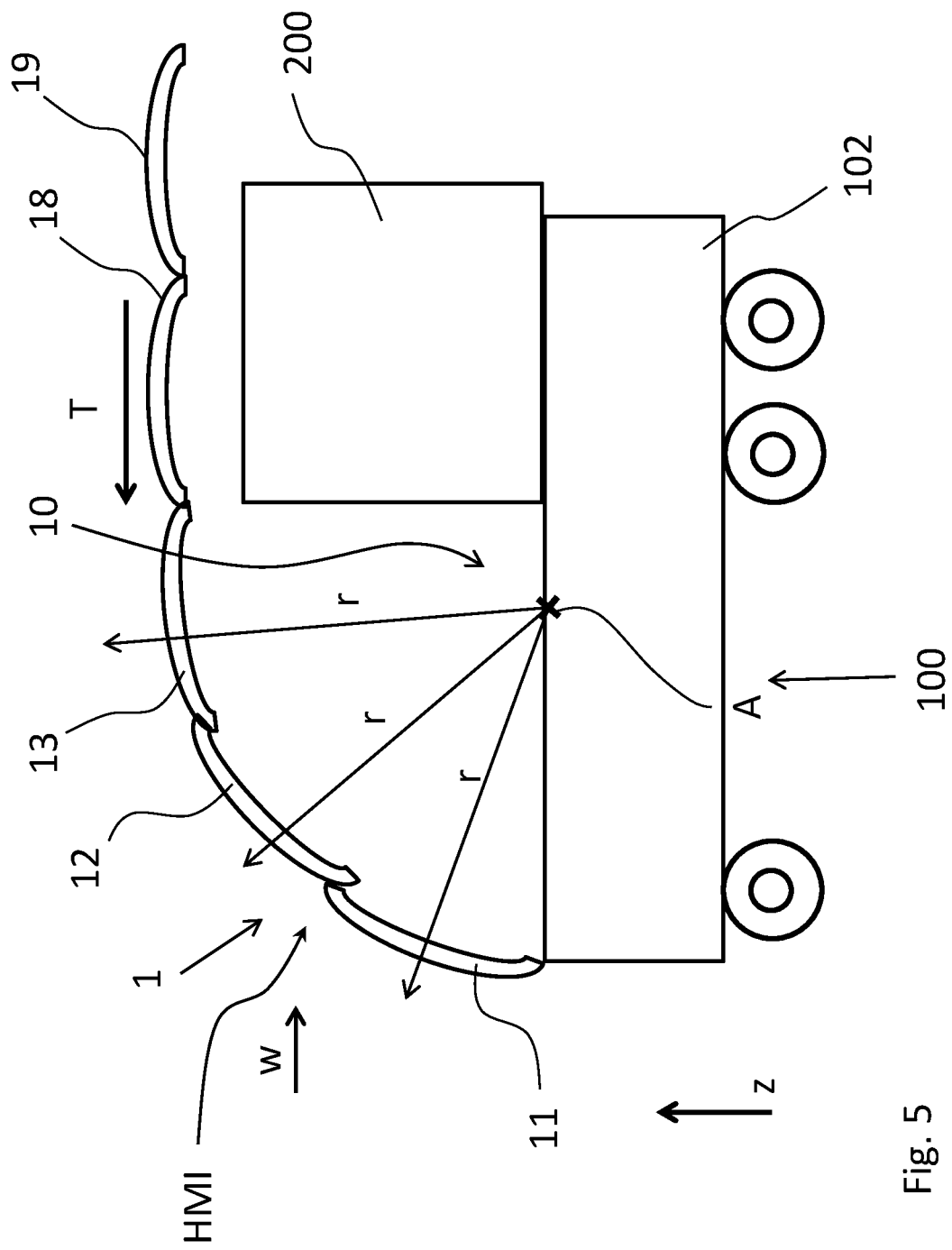
FIG. 5 shows a sectional side view of a vehicle according to another embodiment of the present invention.

With respect to FIG. 5, an additional embodiment of the present invention is shown. The embodiment is here similar to the embodiment shown in FIG. 3b with the exception that the wind deflector 1 comprises an additional protecting cover 18, 19, wherein the additional protecting cover 18, 19 is configured such that it can be expanded from the wind deflector 1 when the wind deflector is in the wind deflecting state and along an extension of the vehicle 100 in the opposite direction to the vehicle's travelling direction T. Thereby, the additional protecting cover 18, 19 may cover at least an additional portion of the vehicle 100 and/or at least a portion of the cargo transporting member 200. Accordingly, in addition to deflect wind, the wind deflector 1 may also be used to cover objects which are provided further behind on the vehicle 100. In the shown embodiment, the additional protecting cover 18, 19 covers the cargo transporting member 200. The additional protecting cover 18, 19 is here provided as at least two separate members which are expandable in the opposite direction to the vehicle's travelling direction T. The at least two separate members 18, 19 may be configured similarly as the two or more wind deflecting portions 11, 12, 13 as disclosed herein.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising means for attaching a cargo transporting member thereto, wherein the vehicle further comprises a wind deflector for deflecting wind from the cargo transporting member when being attached to the vehicle, wherein the wind deflector comprises:
   two or more wind deflector portions which are configured to deflect wind when the vehicle is travelling in a travelling direction,
   wherein the wind deflector is configured to be expanded into at least a first wind deflecting state and collapsed into a collapsed state,
   wherein the two or more wind deflector portions are configured to be pivoted relative each other with respect to a common rotational axis so that the wind deflector is expanded and collapsed between the first wind deflecting state and the collapsed state,
   wherein the wind deflector is arranged such that the common rotational axis is at least provided behind the two or more wind deflector portions when the wind deflector is in the collapsed state, as seen with respect to the travelling direction, and
   wherein the wind deflector is provided on an upwardly facing surface of the vehicle.

2. The vehicle of claim 1, wherein the two or more wind deflector portions are separate members.

3. The vehicle of claim 2, wherein the two or more wind deflector portions are in the form of lamellas and/or shells.

4. The vehicle of claim 1, wherein the two or more wind deflector portions are configured to be stackable in the collapsed state so that they are at least partly overlapping each other in a radial direction with respect to the common rotational axis.

5. The vehicle of claim 1, wherein the wind deflector is configured to be in a third state where there is an open gap between at least two of the two or more wind deflector portions, allowing wind to enter the gap when the vehicle is travelling in the travelling direction.

6. The vehicle of claim 1, wherein the two or more wind deflector portions comprise a canvas member which forms a wind deflecting surface when the wind deflector is expanded into the first wind deflecting state.

7. The vehicle of claim 1, wherein at least one pair of two consecutively arranged wind deflector portions of the two or more wind deflector portions are connectable to each other so that one wind deflector portion thereof pulls on the other wind deflector portion when the wind deflector is expanded to the first wind deflecting state.

8. The vehicle of claim 7, wherein the at least one pair of two consecutively arranged wind deflector portions are further connectable to each other so that one wind deflector portion thereof pulls on the other wind deflector portion when the wind deflector is collapsed to the collapsed state.

9. The vehicle of claim 7, wherein the wind deflector further comprises at least one intermediate engagement portion for the at least one pair of two consecutively arranged wind deflector portions,
   wherein the at least one intermediate engagement portion is configured so that one wind deflector portion of the at least one pair of two consecutively arranged wind deflector portions pulls on the other wind deflector portion thereof when the wind deflector is expanded to the first wind deflecting state, and/or
   wherein the at least one intermediate engagement portion is configured so that one wind deflector portion of the at least one pair of two consecutively arranged wind deflector portions pulls on the other wind deflector portion thereof when the wind deflector is collapsed to the collapsed state.

10. The vehicle of claim 1, wherein the two or more wind deflector portions, when being in the first wind deflecting state, are configured to form a continuous curve-shaped outer peripheral wind deflecting surface facing the direction of the wind which is opposite to the travelling direction, as seen in a sectional plane being perpendicular to the common rotational axis.

11. The vehicle of claim 10, wherein the continuous curve-shaped outer peripheral wind deflecting surface comprises a human machine interface configured to provide adaptable visual information to an ambient surrounding.

12. The vehicle of claim 1, wherein at least one of the two or more wind deflector portions comprises at least one air pocket which is configured to be filled with pressurized air for expanding the at least one wind deflector portion and to be emptied from pressurized air for collapsing the at least one wind deflector portion.

13. The vehicle of claim 1, further comprising a control unit configured for controlling expanding and collapsing of the wind deflector.

14. The vehicle of claim 13, wherein the control unit is configured to expand the wind deflector to an expanded emergency state when it is determined that a collision of the vehicle with an external object is occurring or is about to occur.

15. The vehicle of claim 13, wherein the control unit is configured to collapse the wind deflector to a collapsed wind resistance state when it is determined that an acceleration of the vehicle is above a predefined threshold value and/or when it is determined that the vehicle is travelling in a downhill slope.

16. The vehicle of claim 13, wherein the control unit is configured to expand the wind deflector to an expanded wind resistance state configured to provide at least one open gap for wind below at least one of the two or more wind deflector portions when it is determined that an acceleration of the vehicle is above a predefined threshold value and/or when it is determined that the vehicle is travelling in a downhill slope.

17. The vehicle of claim 13, wherein the control unit is configured to individually control the pivoting motion of the two or more wind deflector portions.

18. The vehicle of claim 1, wherein the vehicle is an autonomous vehicle.

19. The vehicle of claim 1, wherein the common rotational axis extends in a direction which is substantially parallel to a transverse direction of the vehicle.

20. The vehicle of claim 1, further comprising at least one perception sensor, wherein the at least one perception sensor is provided behind at least one of the two or more wind deflector portions, as seen in the travelling direction.

21. The vehicle of claim 1, wherein the wind deflector is positioned on a chassis unit of the vehicle.

22. The vehicle of claim 20, wherein the at least one perception sensor is one or more of a LIDAR, a RADAR, and a camera.

* * * * *